United States Patent [19]

Jarema

[11] Patent Number: 5,478,491

[45] Date of Patent: * Dec. 26, 1995

[54] NMP/D-LIMONENE PAINT STRIPPER WITH EVAPORATION INHIBITOR

[75] Inventor: Chester P. Jarema, Sterling Heights, Mich.

[73] Assignee: Specialty Environmental Technologies, Inc., Auburn Hills, Mich.

[*] Notice: The portion of the term of this patent subsequent to Mar. 29, 2011, has been disclaimed.

[21] Appl. No.: 263,778

[22] Filed: Jun. 23, 1994

Related U.S. Application Data

[63] Continuation-in-part of Ser. No. 194,496, Feb. 10, 1994, Pat. No. 5,468,415, which is a continuation of Ser. No. 911,188, Jul. 9, 1992, Pat. No. 5,298,184.

[51] Int. Cl.$^6$ ............... C11D 7/22; C11D 7/26; C11D 7/32; C09D 9/00
[52] U.S. Cl. ............ 252/171; 252/162; 252/163; 252/170; 252/DIG. 8; 252/542; 134/38
[58] Field of Search ............... 252/163, 171, 252/162, 170, DIG. 8, 542; 134/38

[56] References Cited

U.S. PATENT DOCUMENTS

| | | | |
|---|---|---|---|
| 3,979,219 | 9/1976 | Chang et al. | 206/271 |
| 3,983,047 | 9/1976 | Vinson | 252/119 |
| 4,120,810 | 10/1978 | Palmer | 252/153 |
| 4,269,724 | 5/1981 | Hodson | 252/171 |
| 4,428,871 | 1/1984 | Ward et al. | 252/542 |
| 4,445,939 | 5/1984 | Hodson | 134/2 |
| 4,533,487 | 8/1985 | Jones | 252/170 |
| 4,620,937 | 11/1986 | Dellutri | 252/143 |
| 4,666,626 | 5/1987 | Francisco | 252/153 |
| 4,749,510 | 6/1988 | Nelson | 252/166 |
| 4,764,222 | 8/1988 | Colegrove | 234/38 |
| 4,865,758 | 9/1989 | Carter | 252/171 |
| 5,006,279 | 4/1991 | Grobbel | 252/542 |
| 5,011,621 | 4/1991 | Sullivan | 252/162 |
| 5,035,829 | 7/1991 | Suwala | 252/170 |
| 5,049,300 | 9/1991 | Fusiak et al. | 252/162 |
| 5,098,591 | 3/1992 | Stevens | 252/162 |
| 5,098,592 | 3/1992 | Narayanan et al. | 252/162 |
| 5,112,516 | 5/1992 | Koetzle | 252/162 |
| 5,124,062 | 6/1992 | Stevens | 252/162 |
| 5,154,848 | 10/1992 | Narayanan et al. | 252/162 |
| 5,167,853 | 12/1992 | Stevens | 252/162 |
| 5,288,335 | 2/1994 | Stevens | 134/38 |
| 5,298,184 | 3/1994 | Jarema | 252/171 |
| 5,334,331 | 8/1994 | Fusiak | 252/542 |

FOREIGN PATENT DOCUMENTS 16060 of 1903 United Kingdom.

OTHER PUBLICATIONS

"Technical Information, N–Methyl Pyrrolidone Handling and Storage", BASF, Date of publication unavailable.
"The Safety, Toxicology, and Biodegradation of d–Limonene", Florida Chemical Company, Inc. (Revised Jan. 30, 1989).
"D–Limonene", Florida Chemical Company, Inc. (Jun. 24, 1991).
"Material Safety Data Sheet, N–Methyl–Pyrrolidone", Amcor Industries, Inc. (Mar. 19, 1992).
"Non–Flammable Paint Stripers", Allied Chemical and Dye Corporation, Date of publication unavailable.
Wax definition—Hauoley's Condensed Chemical Dictionary, Eleventh Edition, Date of publication unavailable.
Beeswax definition—Hauoley's Condensed Chemical Dictionary, Eleventh Edition, Date of publication unavailable.
Carnauba Wax Definition—Hauoley's Condensed Chemical Dictionary, Eleventh Edition, Date of publication unavailable.
Sonneborn petrolatums Brochure, Date of publication unavailable.
Material Safety Data Sheet for Parascal Wax, Date of publication unavailable.
"Shell paraffin and microcrystalline waxes: Shellwax®" Technical Bulletin Shell Oil Company, Date of publication unavailable.
"Sonneborn microcrystalline waxes: Advantages and applications." Date of publication unavailable.
Quantum Chemical Corporation, Material Safety Data Sheet for Emery 1656 Lanolins, Date of publication unavailable.

Primary Examiner—Linda Skaling Therkorn
Assistant Examiner—Michael P. Tierney
Attorney, Agent, or Firm—Harness, Dickey & Pierce

[57] ABSTRACT

Compositions according to the present invention include as essential components: from about 10% to about 50% by weight of d-limonene, from about 50% to about 90% by weight of N-methyl pyrrolidone, and from about 0% to about 10% by weight of a thickener and from about 0.5% to about 5% of an evaporation inhibiting agent such as wax.

21 Claims, No Drawings

NMP/D-LIMONENE PAINT STRIPPER WITH EVAPORATION INHIBITOR

RELATED APPLICATIONS

This application is a continuation-in part of U.S. patent application Ser. No. 08/194,496, filed Feb. 10, 1994, entitled "Paint Stripper Composition", now U.S. Pat. No. 5,468,415.; which in turn is a continuation of U.S. patent application Ser. No. 07/911,188, filed Jul. 9, 1992, entitled "Paint Stripper Composition", now U.S. Pat. No. 5,298,184.

BACKGROUND OF THE INVENTION

1. Field of the Invention

The present invention relates to a paint stripper composition for the removal of cured or partially cured paint materials from substrates. More specifically, the invention relates to an improved paint stripper containing a combination of N-methyl-2-pyrrolidone (NMP) and d-limonene for effective paint removal and a more pleasing aroma than other known paint stripping compositions. Still more specifically, the present application relates to an NMP/d-limonene paint stripper which has evaporation inhibitors for reducing evaporation of the active stripper components.

2. Description of Relevant Art

The term "paint" as hereafter used refers to coatings such as epoxies, enamels, latexes, primers, basecoats, clearcoats, lacquers, varnishes, shellacs and polyurethane finishes used to protect and/or beautify substrates. As used herein, the term "paint stripper" refers to compositions which remove or facilitate the removal of a paint, as defined above, from a substrate. Chemical based paint strippers have enjoyed widespread commercial application due to their relative ease of use over various physical scraping and/or sanding methods of paint removal. Many of these paint strippers are solvent based, utilizing methylene chloride, methanol, or butanol, among others, as solvent components. While these solvents yield significant paint removal, they also present potential health, safety, and environmental concerns to both the user and the surrounding environment.

U.S. Pat. No. 2,507,983 discloses a paint stripper which contains methylene chloride and methylcellulose, a thickening agent used to increase the viscosity of the formulation. Methylene chloride is an effective low-cost paint stripper characterized by high vapor pressure (400 mm Hg at 75° F.) which causes it to evaporate very rapidly. This high vapor pressure leads to an extreme vapor inhalation hazard. In addition, methylene chloride is a suspected carcinogen as well as a dermal irritant. A further concern of methylene chloride deals with possible ground water contamination when the residual stripper is removed from the substrate.

In an effort to reduce the health, safety, and toxicity dangers of methylene chloride based paint strippers, several formulations utilizing N-methyl-2-pyrrolidone (NMP) have been developed. NMP has been proposed as a substitute for chlorinated solvents because of its effectiveness, low toxicity, biodegradability and high flash point. For example, U.S. Pat. No. 5,049,300, which issued to Frusiak, discloses paint stripping compositions which include formic acid, NMP and ethyl-3-ethoxypropionate (EEP). This formulation acidities the NMP with an organic or inorganic acid with a pH of 4.0 or less, preferring the use of formic, sulfuric, or phosphoric acid. U.S. Pat. No. 4,812,255 and U.S. Pat. No. 4,749,510 also use formic acid as a component of the overall composition. However, each of the above formulations still presents a dermal safety hazard due to the low pH of the formic acid (pH=2.3) and other components.

U.S. Pat. No. 5,006,279 discloses a paint stripper composition which includes NMP and at least one mononuclear aromatic hydrocarbon. Similarly, U.S. Pat. Nos. 4,120,810; 4,749,510; and 4,666,626 contain aromatic hydrocarbons within the formulation.

These and other formulations, however, may still present potential health, safety, and dermal hazards based on the absorption rate of the particular aromatic hydrocarbon or aromatic solvent used. In addition, many aromatic hydrocarbons are believed to be carcinogenic, pose environmental concerns, and are troublesome regarding disposal of spent chemicals.

U.S. Pat. No. 5,011,621, which issued to Sullivan, relates to mixtures of NMP, selected co-solvents (which may include aromatic hydrocarbons and terpenes such as d-limonene), as well as animal and/or vegetable oil as a means to effectively remove paint from substrates. However, the presence of one or more of these natural components such as tallows and fatty acids may lead to the growth of microbiological organisms within the formulation, thereby decreasing the "shelf life" of the product. The presence of microbiological organisms could lead to altered product performance as well as a noxious and rancid odor, especially when the product is exposed to sunlight.

The paint stripper of my prior U.S. Pat. No. 5,298,184 provides an effective improvement in paint stripper technology. However, it has been found that in outdoor or other situations where large volumes of air, heat and/or sunlight are prevalent, the effectiveness was reduced due to unacceptable levels of evaporation of the product. This problem is also prevalent in the prior NMP-type strippers.

Heretofore, evaporative inhibitors have been utilized in methylene chloride systems. Such inhibitors include solvated waxes or the like which form heavy films or a gelatinous coat on the exposed surface of the stripper upon being applied to a paint substrate to reduce evaporation. However, such waxes have not been found to be useful in NMP based strippers because it is known that useful waxes, such as paraffin, are not soluble in NMP. Thus, even though the NMP strippers have had evaporation problems, such as that mentioned above, it has been generally accepted by those in the art that waxes are not soluble in NMP, and therefore, the use of waxes has been rejected in these strippers. Thus, there remains a need to provide an NMP stripper composition which has reduced evaporation.

There also remains a need in the art to provide an effective stripper which has a less than offensive odor, a long shelf life and is effective for the stripping of most paints.

Accordingly, it is an object of this invention to provide effective paint strippers with improved health, safety and environmental characteristics.

A particular object of the invention is to provide an improved paint stripper with lower toxicity, volatility, and irritability which is both methylene chloride and aromatic hydrocarbon free.

Another object of the invention is to provide an acceptable fragrance or aroma to the paint stripper which would improve the consumer acceptance.

Still, another object of the invention is to provide an improved paint stripper with increased product longevity or shelf life, which is immune from possible microbiological growth.

SUMMARY OF THE INVENTION

The above objects are achieved and the shortcomings in the prior art are overcome by the present invention, a non-toxic paint stripper with an acceptable aroma which is methylene chloride and aromatic hydrocarbon free, thereby reducing exposure to suspected carcinogens.

Compositions according to the present invention include as essential components: from about 10% to about 55% by weight of d-limonene, from about 45% to about 90% by weight of N-methyl-2-pyrrolidone (NMP), and from about 0% to about 10% by weight of a thickener.

Within the ranges defined above, NMP and d-limonene exert an improved paint removal effect not suggested in the art. The incorporation of naturally derived d-limonene further provides a more palatable and acceptable citrus fragrance than prior art paint stripper compositions.

With respect to the reduced evaporation stripper embodiment, an evaporation inhibiting quantity of a film forming agent is employed. The wax employed must be at least partially insoluble in the stripper composition at the temperature at which the stripper will be used. However, in order to provide the filming effect, the wax must also be at least partially soluble in the stripper. In order to accomplish this, the wax to be employed is typically at least partially insoluble in either the NMP or d-limonene, but at least partially soluble in the other component.

Further objects, benefits and advantages of the present invention will be realized upon review of the description of the preferred embodiments, and the examples and claims appended hereto wherein all percentages are percentages by weight unless otherwise specified.

DESCRIPTION OF THE PREFERRED EMBODIMENTS

In accordance with the present invention there is provided a paint stripping composition which is simple in nature including two effective ingredients which when formulated together provide unexpectedly advantageous results. The two critical ingredients of the present invention are NMP and d-limonene. In a preferred embodiment these components are used with a thickener to allow the stripper to maintain contact with surfaces which may be at an angle other than horizontal. Generally, compositions of the present invention include from about 10% to about 55% by weight of d-limonene, from about 45% to about 90% by weight of NMP and from about 0 to about 10% by weight of a thickener. More typically, compositions of the present invention include from about 20% to about 40% d-limonene, from about 60% to about 80% NMP, and from about 1% to about 5% thickener. In preferred embodiments of the present invention the compositions include from about 28% to about 34% d-limonene, from about 65% to about 70% NMP and from about 1% to about 2% thickener.

The NMP constituent of the present invention is of course a main paint stripping component of the stripper compositions of the present invention. However, it has been found in the present invention that the combination of NMP and d-limonene in the paint stripper composition provides advantageous results above and beyond those expected or suggested by the art. N-methyl-2-pyrrolidone is a commercially available, low toxicity component. This component may be selected from any one of a number of commercially available forms. However, NMP is relatively expensive. Therefore, the use of d-limonene in the amounts set forth above reduces the overall cost of the stripper compositions of the present invention and provides improved results over the use of NMP alone.

In the present invention a naturally derived d-limonene is utilized as a major constituent. The use of such quantities of d-limonene reduces the amount of NMP in the composition which as stated above is an expensive component. Unexpectedly, even though less NMP is utilized a synergistic result is obtained with these higher levels of d-limonene in that an improved stripper composition is obtained which has better stripping properties than strippers containing significantly higher levels of NMP. Additionally, d-limonene also has a pleasant orange citrus aroma which is critical in the present invention. This citrus aroma is provided by use of naturally formulated d-limonene which is extracted from orange peel. In contrast, synthetically produced d-limonene would not be preferable in that synthetically produced d-limonene does not include the enhanced odorant naturally occurring in d-limonene derived from orange peel. However, synthetically produced d-limonene would provide the advantageous paint stripping results of the present invention, and therefore may be substituted if a citrus odor is not desirable or necessary.

As set forth above, in a preferred embodiment, thickeners are utilized in the present invention to produce a readily usable paint stripper composition. Thickeners useful in the present invention include preferably the cellulosic thickeners known to those skilled in the art. However, other thickeners such as clays, starches, gums, and swellable polymers can be useful in the present invention.

Paint strippers of the present invention have been found to remove paint such as epoxy enamels, soya alkyds, oil modified polyesters, vinyl acrylic latex and varnishes, among others.

In accordance with an alternative embodiment of the present invention, the paint stripper contains effective amounts of an evaporation inhibiting agent. Contrary to the recognized teachings of the art, by utilizing d-limonene and NMP an evaporation inhibitor, such as wax, which is partially insoluble in the composition at the temperature to which it will be subjected during use, and forms a layer when exposed to air, can be employed in an NMP-type paint stripper. It is important to note that the evaporation inhibiting agent must also be partially soluble in the composition to provide the desired film forming characteristics. It has been found that an evaporation inhibiting agent that is partially insoluble in the NMP/d-limonene and forms an evaporation inhibiting surface layer is suitable in the present invention. A particularly suitable agent is one which is at least partially soluble in either d-limonene or NMP, and at least partially insoluble in the other of d-limonene or NMP. In a preferred embodiment, the evaporation inhibiting agent is soluble in the d-limonene, but insoluble in the NMP. Preferred evaporation inhibiting agents are provided such that upon application of the paint stripper to a surface and exposure of the stripper to air, the evaporative inhibitor forms a substantially solvent impervious protective layer which separates the NMP and d-limonene working components from the air and reduces the evaporation of these active ingredients from the stripper. This results in a longer retention time of the active ingredients on the paint surface. This is important in paint strippers since the longer the active ingredients are in contact with the substrate to be stripped, the more effective the stripper will be in stripping paint or other materials from the surface. Additionally, the agent must be selected such that it does not detrimentally affect the advantageous stripping properties of the composition.

Particularly suitable evaporation inhibiting agents useful in the present invention generally include waxes which are partially insoluble in the stripper composition at the temperature of application, yet remain at least partially soluble in the solution. This is typically accomplished by using a wax which would be at least partially soluble in the d-limonene and partially insoluble in the NMP, and which form an evaporation inhibiting surface layer upon exposure to air. The evaporation inhibiting surface layer is substantially impermeable to the NMP and d-limonene solvents, preventing evaporation of these solvents. Suitable waxes may include paraffins, carnauba, beeswax, microcrystalline waxes, polyester waxes, or the like, provided they meet the criteria set forth above. A preferred wax for use in the present invention is paraffin.

The evaporative inhibiting agents are useful in the present invention in quantities of generally from about 0.1% to about 10% and preferably from about 0.5 to 3%. Use of higher levels creates precipitation of the waxes from solution and, quantities below this, are not effective in preventing evaporation.

Typically, the amount and type of wax used will vary depending upon the temperature at which the composition is utilized. Without wishing to be bound by theory, it is believed that because the wax is partially insoluble upon initial evaporation of the solvents, the wax rapidly becomes less soluble and forms the solvent impermeable surface layer, since a higher temperature would allow more wax to stay in solution. Therefore, at higher operating temperatures, higher amounts of wax or waxes with higher melting points, are required for the same result. Typically, compositions of the present invention are operable for forming the proper layer in temperatures of from about 70° F. to about 130° F., with from about 1% to about 3% paraffin wax. For operation outside of these ranges, it may be necessary to use more or less wax or waxes with higher melting points, depending on the temperature of the final application.

The paint strippers of the present invention are designed for use as consumer products and therefore must be of low toxicity, have good shelf life properties and be effective on a wide variety of paints. Thus, constituents such as tallows, fatty acid containing substances or the like, which can become rancid are undesirable in the present invention since such would substantially reduce the shelf life.

Other additives which can be included without deviating from the scope of the present invention include surfactants, stripping accelerators and the like, or other readily advantageous components known for use in paint strippers provided they do not detract from the odor or shelf life properties of the present invention. The compositions of the present invention typically have shelf lives at least two years, depending on the characteristics of the storage. Generally speaking however, such compositions, only require a retail shelf life of six months to one year, since they are in the consumer market.

Further understanding of the present invention will be had in reference to the following examples which are set forth herein for purposes of illustration of the present invention rather than limitation.

EXAMPLE I

Initially, various formulations of the present invention have been prepared and are set forth in Table I below.

TABLE I

| | Sample Formulations of the Present Invention | | | | | | | | | | |
|---|---|---|---|---|---|---|---|---|---|---|---|
| Composition | A | B | C | D | E | F*** | G*** | H*** | I*** | J*** | K*** |
| NMP | 49% | 59% | 69% | 79% | 89% | 69% | 69% | 69% | 69% | 69% | 69% |
| d-limonene | 50% | 40% | 30% | 20% | 10% | 30% | 30% | 30% | 30% | 30% | 30% |
| Methocel-311 Thickener* | 1% | 1% | 1% | 1% | 1% | 1% | 1% | 1% | 1% | 1% | 1% |
| Triton N-101** | — | — | — | — | — | 1% | 2% | 5% | — | — | — |
| Mono-Ethanol-Amine(MA) | — | — | — | — | — | — | — | — | 1% | 2% | 5% |

*Dow Chemical
**Union Carbide
***These formulations included the specified percentage of Triton or MEA with the remainder being a preferred formulation of 69% NMP, 30% d-limonene and 1% Methocel Thickener.

For comparison purposes, Formulations in accordance with those set forth in U.S. Pat. No. 5,011,621 have been prepared following the direction set forth therein, and are set forth in Table II below.

TABLE II

| Formulations as Set Forth in U.S. Pat. No. 5,011,621 | | | | | | | | |
|---|---|---|---|---|---|---|---|---|
| Composition | 2 | 4 | 6 | 7 | 10 | 11 | 13 | 15 |
| N-methyl-2-pyrrolidone | 50 | 40 | 40 | 35 | 30 | 30 | 30 | 40 |
| Soybean Oil | 50 | 60 | 50 | 50 | | | | |
| Dipropylene Glycol Methyl Ether Acetate | | | 10 | | | | | |
| Xylene | | | | 15 | | | | |
| Corn Oil | | | | | 70 | | | |
| Peanut Oil | | | | | | 70 | | |
| Olive Oil | | | | | | | 70 | |
| Thickener (Fumed Silica) | | | | | 3 | 3 | 3 | |
| Rape Seed Oil | | | | | | | | 55 |
| d-limonene | | | | | | | | 5 |

A comparative test was conducted utilizing the various formulations set forth in Tables I and II to determine each formulations paint stripping capabilities. To conduct the comparative test, substrates were coated with Rust-oleum®, a two part epoxy (Zynolyte Products Co. tub and tile finish, Carson, Calif.), an oil modified urethane resin (Satin XL88 Waterlox, Cleveland, Ohio), vinyl acrylic latex (Sears) and varnish (approximately 30–40 year old varnish of unknown manufacture). Each of the above paints were applied to a sheet metal surface and allowed to cure for at least thirty-six hours. Each of the compositions were applied to the paint surface with a paint brush such that the entire surface was wetted with the particular composition. The results are presented in Table III wherein the numbers indicate the lift-off time of each composition in seconds.

TABLE III

| Sample Description | Lift-Off Times Recorded in Seconds ||||| 
|---|---|---|---|---|---|
| | Rust-oleum ® | Epoxy | Urethane | Sears | Varnish |
| A. (Table I) | 222 | 609 | 315 | 48 | 255 |
| B. (Table I) | 219 | 525 | 311 | 45 | 242 |
| C. (Table I) | 244 | 501 | 302 | 40 | 245 |
| D. (Table I) | 245 | 567 | 300 | 33 | 244 |
| E. (Table I) | 242 | 574 | 351 | 29 | 237 |
| F. (Table I) | 228 | 500 | 299 | 45 | 247 |
| G. (Table I) | 227 | 548 | 241 | 43 | 234 |
| H. (Table I) | 212 | 453 | 229 | 40 | 225 |
| I. (Table I) | 187 | 397 | 217 | 27 | 219 |
| J. (Table I) | 166 | 399 | 197 | 26 | 187 |
| K. (Table I) | 154 | 390 | 174 | 21 | 175 |
| #2 (Table II) | 306 | * | 360 | 135 | 341 |
| #4 (Table II) | 393 | * | 361 | 195 | 326 |
| #6 (Table II) | 812 | * | 494 | 187 | 259 |
| #7 (Table II) | 245 | * | 281 | 272 | 272 |
| #10 (Table II) | 430 | * | 388 | 262 | 325 |
| #11 (Table II) | 448 | * | 417 | 316 | 462 |
| #13 (Table II) | 572 | * | 410 | 252 | 328 |
| #15 (Table II) | 408 | * | 337 | 197 | 292 |

*No lift-off noted after two hours.

As demonstrated in the above table the lift-off time for compositions of the present invention were significantly less than those for the formulations suggested in U.S. Pat. No. 5,011,621.

EXAMPLE II

The composition of Example I, at Sample C, was comparatively tested for stripping characteristics versus a stripper formulation including 99% NMP and 1% Methocel. The compositions were tested in accordance with the procedure of Example I on the same finishes. The results of the tests are set forth in Table IV wherein lift-off times are set forth in seconds.

TABLE IV

| Sample Description | Lift-Off Times Recorded in Seconds ||||| 
|---|---|---|---|---|---|
| | Rust-oleum ® | Epoxy | Urethane | Sears | Varnish |
| 69% NMP; 30% d-limonene; 1% Methocel | 226 | 483 | 310 | 40 | 229 |
| 99% NMP; 1% Methocel | 232 | * | 478 | 42 | 259 |

*No lift-off noted.

As demonstrated by these results, the compositions of the present invention provide faster results for the stripping of paint as compared to NMP alone.

EXAMPLE III

A composition of the present invention is formulated by mixing 30% d-limonene obtained from Florida Chemical Company, Inc. of Lake Alfred, Fla., with 69% n-methylpyrrolidone obtained from BASF Corp., Parsippany, N.J., and a cellulosic thickener such as Methocel in an amount of 1%. These components were mixed in a suitable container and applied to various painted substrates.

The composition was found to remove various paints, was found to have a long shelf life, and had a pleasant odor. As will be appreciated by those skilled in the art, it should also be noted that the composition is made up of biodegradable components.

EXAMPLE IV

A solution of 10% paraffin wax in d-limonene was prepared by melting 20 g of paraffin wax in a beaker, then adding 180 g of d-limonene and mixing the solution. To 30 g of this mixture (i.e. 27 g d-limonene, 3 g wax) 70 g NMP was weighed out and slowly added. After only an addition of 3–5 g NMP, the wax began to leach out of solution.

Thereafter, 10 g of the 10% wax solution was diluted with 20 g d-limonene. To this 30 g mixture (i.e. comprising 29 g d-limonene and 1 g wax), 70 grams NMP was added. Some wax leached out. Upon heating the solution to approximately 75°–80° F., the solution became clear.

EXAMPLE V

One gram of paraffin wax was melted and added to 29 g d-limonene. Thereafter, 1 g of Methocel-311 and 69 g NMP were mixed in to form a solution. A thick mixture resulted that was clear at 80 ° F.

EXAMPLE VI

One gallon of a stripper composition was prepared by mixing 35.02 g paraffin wax (0.95 wt. %), 1110 g of d-limonene (30.0 wt. %), 37 g of Methocel-311 (1.0 wt. %), and 2517.9 g NMP (68.05 wt. %) in the following manner. The wax was first melted in a beaker and the d-limonene was added to the melted wax. The Methocel-311 was then added along with the NMP with mixing. All this was done on a hot plate. When the temperature reached approximately 83°–85° F., the mixture was clear. At 72° F., the mixture was cloudy and had a viscosity of 3020 cps.

EXAMPLE VII

The composition of Example VI was compared to the composition C, from Table I, for evaporation inhibiting properties. This was done by weighing out 3 samples of each product into an aluminum tin. The samples were carefully weighed on an analytical balance, and then placed in the oven at about 95° F. overnight. The pans were weighed the next day. The results of the evaporation tests for composition C, from Table I, are set forth below in Table V.

TABLE V

| | Composition C from Table I |||
|---|---|---|---|
| Sample Description | Sample A1 | Sample A2 | Sample A3 |
| wt. on pan + composition | 6.0003 | 6.0158 | 6.0146 |
| wt. pan | 0.9967 | 1.0058 | 1.0038 |

TABLE V-continued

Composition C from Table I

| Sample Description | Sample A1 | Sample A2 | Sample A3 |
|---|---|---|---|
| wt. composition After Heating | 5.0036 | 5.0100 | 5.0108 |
| wt. pan & residue | 1.0569 | 1.0740 | 1.0835 |
| wt. pan | 0.9967 | 1.0058 | 1.0038 |
| wt. residue | 0.0602 | 0.0682 | 0.0747 |
| % remaining | 1.20 | 1.36 | 1.59 |

$$\text{Avg. \% remaining after volatilization} = \frac{1.2 + 1.36 + 1.59}{3} = 1.38\%$$

By way of comparison, the results of the evaporation tests on the sample of Example VI are set forth below in Table VI.

TABLE VI

Composition of Example VI

| Sample Description | B1 | B2 | B3 |
|---|---|---|---|
| wt. on pan + Example VI composition | 6.0054 | 6.0272 | 6.0142 |
| wt. pan | 1.0006 | 1.0047 | 1.0046 |
| wt. Example VI composition | 5.0048 | 5.0225 | 5.0126 |
| After Heating wt. pan & residue | 4.8340 | 4.8657 | 4.8510 |
| wt. pan | 1.0006 | 1.0047 | 1.0046 |
| wt. residue | 3.8334 | 3.8634 | 3.8464 |
| % remaining | 76.6% | 76.9% | 76.7% |

$$\text{Avg. \% remaining after volatilization} = \frac{76.6 + 76.9 + 76.7}{3} = 76.7\%$$

From the above results, it can be seen that the composition of Example VI has greatly improved evaporation inhibiting properties over that of composition C of Table I, which does not include a wax constituent.

Along these lines, a number of different sample formulations were tested for the percent of the composition remaining after volatilization (i.e. evaporation) utilizing different types of waxes to determine whether certain commercially available waxes work better than others.

Initially, various samples were prepared, as described, with reference to Example III with the percentage of wax used being subtracted from the amount of NMP used to give a 100% total by weight. For example, an amount of 0.25% by weight of a paraffin wax, such as Paraseal wax, was added to a composition, including 68.75% by weight NMP, 30% by weight d-limonene and 1% by weight of a celluloic thickener known commercially as Methocel. A predetermined amount of the sample was then applied to the center of an aluminum tin and the tin was placed overnight in a Blue Max Oven, Model No. OV-490H-2, having a temperature range of about 100°–500° F., and allowed to remain in the oven at 125° F. for sixteen hours. After sixteen hours, the sample was weighed with the weight differential between the raw sample and the baked sample being recorded as the percentage of non-volatiles remaining. The results of the test for percentage remaining after volatilization as described above, is set forth in Table VII below.

TABLE VIII

| Description | Wt. % Remaining After Volatilization @ 125° F. | Appearance @ 70° F. | Visc (cps) @ 70° F. |
|---|---|---|---|
| 0.25% Paraseal | 26.4 | clear | 3,900 |
| 0.50% Paraseal | 52.3 | cloudy | 3,480 |
| 0.75% Paraseal | 47.3 | cloudy | 3,250 |
| 1.00% Paraseal | 2.4 | cloudy | 3,400 |
| 2.00% Paraseal | 3.4 | cloudy | 6,700 |
| 3.00% Paraseal | 4.6 | cloudy | 17,000 |
| 1% Shell 270 (paraffin wax) | 74.9 | cloudy | 11,000 |
| 1% Witco ML-445 (micro-crystalline wax) | 75.6 | cloudy | 6,500 |
| 1% Witco W-835 (micro-crystalline wax) | 71.2 | cloudy | 5,800 |
| 1% Emery 1656 (lanolin) | 2.1 | clear | 3,280 |
| 1% Witco White Protopet 1S (petrolatum) | 2.2 | cloudy | 7,100 |
| 68% NMP; 30% d-limonene; 2% Methocel; 0% wax | 2.6 | opaque | 70,000* |

*at 150° F.

As indicated by the results set forth in Table VII above, the compositions including 1% Shell 270 (paraffin) and 1% Witco MC-445 (micro-crystalline) wax exhibited the greatest resistance to evaporation at 125° F. Conversely, the compositions, including 1% lanolin and petrolatum, failed to improve the composition's resistance to evaporation.

Similarly, the same tests were run for paint stripper compositions including various amounts of wax wherein the amount of NMP was reduced by an equivalent amount of wax. Again, the samples were placed on the center of an aluminum tin and placed into an oven for approximately 16 hours. The percentage of sample remaining after volatilization at 103° F. is set forth below in Table VIII. Also, provided are the results for allowing the sample compositions to dry at a room temperature of 72° F. for 16 hours.

TABLE VII

| Description | Wt. % Remaining after Volatilization at 72° F. | Wt. % Remaining after Volatilization at 103° F. |
|---|---|---|
| 0.25% Paraseal | 91.9 | 66.3 |
| 0.50% Paraseal | 93.7 | 78.4 |
| 0.75% Paraseal | 93.9 | 82.7 |
| 2.0% Paraseal | 91.7 | 72.1 |
| 1.0% Witco ML-445 | 89.0 | 75.8 |
| 1.0% Witco W-835 | 87.8 | 76.6 |

According to the results set forth in Table VIII, both the Paraseal and Witco waxes exhibit excellent resistance to volatilization at 72° F., as expected. As the temperature was raised to 103° F., the composition, including 0.75% by weight Paraseal wax, exhibited significantly better resistance to volatilization than the other formulations at 103° F.

For comparative purposes, a number of different formulations were again tested for volatilization utilizing a different oven, namely, a Thelco Oven, Model No. 70DM, which has a temperature range of between about 65°–250° F. A sample of each composition was placed at the center of an aluminum tin and placed in the oven for approximately 16 hours. As with the samples set forth in Tables VII and VIII, the samples included in Table IX were formulated to include anywhere between 66% and 68.75% NMP, 30% d-limonene, 1% Methocel and anywhere between 0.25% to 3.0% by weight of a wax constituent. Again, the amount of NMP was reduced by an equivalent amount of wax which was added to the composition.

According to the results illustrated in Table IX below, the formulations including 1.0% Shell 270 paraffin wax and 3.0% Paraseal paraffin wax, exhibited the best resistance to volatilization (i.e. evaporation) at both 70° F. where no oven was used, and 103° F where the Thelco Model 70 DM oven was utilized.

TABLE IX

| Description | Wt. % Remaining After Volatilization @ 70° F. | Wt. % Remaining After Volatilization @ 103° F. | Wt. % Remaining After Volatilization @ 125° F. |
|---|---|---|---|
| 1.0% carnauba | 76.8 | 7.8 | 2.3 |
| 1.0% beeswax | 69.7 | 71.2 | 14.8 |
| 0.25% Paraseal | 85.3 | 75.8 | 35.4 |
| 0.50% Paraseal | 89.8 | 83.8 | 56.9 |
| 0.75% Paraseal | 92.0 | 84.6 | 56.2 |
| 1.0% Paraseal | 90.1 | 82.6 | 41.9 |
| 2.0% Paraseal | 98.0 | 82.8 | 5.8 |
| 3.0% Paraseal | 98.5 | 85.9 | 6.3 |
| 1.0% Witco ML-445 | 78.2 | 70.7 | 71.6 |
| 1.0% Witco W-835 | 77.4 | 68.9 | 67.9 |
| 1.0% Emery 1656 | 75.4 | 17.5 | 2.1 |
| 1.0% Shell 270 | 98.8 | 97.8 | 73.3 |
| 1.0% Witco White Protopet 1S | 81.8 | 59.8 | 2.4 |
| 68% NMP; 30% d-limonene; 2% Methocel; 0% wax | 75.0 | 10.8 | 2.6 |

As with the previously disclosed test for the percentages remaining after volatilization, all of the samples which included the wax constituent fared better than the sample including 68% NMP, 30% d-limonene and 2% Methocel.

At higher temperatures, (i.e. 125° F.), slightly different results were obtained with regard to the most effective evaporation inhibitors. While the 1.0% Shell 270 paraffin wax still proved to be superior, the 1.0% Witco ML-445 micro-crystalline wax also proved to have better resistance to volatilization at higher temperatures than the other commercially available waxes. Without being bound by theory, it is believed that such results occur because the Shell and Witco waxes have a higher melting point temperature than the Paraseal wax.

To account for the possibility that the amount of exposed surface from sample to sample varied and thus contributed to the results of the percentages of composition remaining after volatilization, a final batch was run wherein the entire sheet of the aluminum tin was covered by the sample. By covering the entire tin, it is intended that the exposed surface area of each sample be constant. With a relatively constant exposed surface area, the results, illustrated in Table X below, appear to be similar to those disclosed in Table IX. Thus, it does not appear that minor differences in the exposed surface area from sample to sample, had much effect on the volatilization results.

TABLE X

| Description of Sample | Wt. % Remaining after Volatilization | | | |
|---|---|---|---|---|
| | 72° F. | 103° F. | 125° F. | 137° F. |
| 0.25% Paraseal | 101.4 | 73.1 | 52.4 | —* |
| 0.50% Paraseal | 100.0 | 79.9 | 60.1 | 2.1 |
| 0.75% Paraseal | 98.0 | 80.4 | 56.2 | 2.1 |
| 1.00% Paraseal | 97.4 | 78.7 | 45.4 | 2.5 |
| 2.00% Paraseal | 97.6 | 74.7 | 24.5 | —* |
| 3.00% Paraseal | 99.3 | 74.5 | 24.5 | —* |
| 1% Witco White Protopet 1S | 98.9 | 61.2 | 2.9 | —* |
| 1% Shell 270 | 96.8 | 96.6 | 77.6 | 51.3 |
| 1% Emery 1656 | 99.4 | 2.2 | 2.2 | —* |
| 1% Witco W-835 | 99.4 | 76.7 | 73.5 | 69.5 |
| 1% Witco ML-445 | 96.3 | 82.6 | 78.4 | 72.0 |
| 1.0% Carnauba | 101.8 | 2.4 | 2.4 | —* |
| 1.0% Beeswax | 97.2 | 68.9 | 50.9 | 58 |
| 69% NMP; 30% d-limonene; 1% Methocel | 99.7 | 1.1 | 1.3 | —* |
| Citristrip 68% NMP; 30% d-limonene; 2% Methocel; 0% wax | 102.1 | 2.7 | 2.8 | —* |

*not tested at 137° F.

It should be noted that the samples which were placed in an aluminum tin at left out for 16 hours at a room temperature of 72° F. included a few samples which had a measured weight percentage over 100%. This can be explained by the fact that the methyl cellulose thickener, Methocel and NMP are both hygroscopic in nature. As with the samples set forth in Table IX, the compositions, including 1.0% Shell 270 and 1.0% Witco ML445 waxes, had the most consistent resistance to evaporation over the temperature range between 72°–125° F. With respect to the testing at 137° F., it was revealed that the waxes with higher melting points, such as beeswax, Witco W-835, Witco ML-445 and Shell 270, showed better evaporation resistance than the lower melting point Paraseal wax.

While the invention has been described with reference to the preferred embodiments above, it is to be understood and appreciated that the invention is susceptible to modification, variation and change without departing from the proper scope and fair meaning of the accompanying claims.

What is claimed is:

1. A paint stripper having a long shelf life and improved odor, said composition consisting essentially of:

from about 10% to about 55% by weight of d-limonene;

from about 45% to about 90% by weight N-methyl pyrrolidone; and an effective amount of an evaporation inhibiting agent which is at least partially insoluble in the composition and forms a film upon exposure to air;

wherein the d-limonene, N-methyl pyrrolidone and evaporation inhibiting agent are equal to approximately 100% by weight.

2. The paint stripper composition of claim 1, further comprising from about 15% to about 40% d-limonene.

3. The paint stripper composition of claim 2, further comprising from about 60% to about 85% N-methyl pyrrolidone.

4. The paint stripper composition of claim 3, further comprising from about 0.50% to about 5% thickener.

5. The paint stripper composition of claim 4, wherein said thickener is selected from the group consisting of cellulosic thickeners, clays, starches, gums, and swellable polymers.

6. The composition of claim 1, wherein said d-limonene is a naturally derived d-limonene having a citrus aroma.

7. The composition of claim 1, wherein said evaporation inhibiting agent is at least partially insoluble in one of the components selected from N-methyl pyrrolidone or d-limonene, and is at least partially soluble in the other of the components.

8. The composition of claim 1, wherein said evaporation inhibiting agent is at least partially soluble in d-limonene, but is at least partially insoluble in N-methyl pyrrolidone.

9. The paint stripper composition of claim 1, wherein said evaporation inhibiting agent is selected from the group consisting of beeswax, carnauba, paraffin, micro-crystalline wax, polyester wax and mixtures thereof.

10. The paint stripper composition of claim 1, wherein said effective amount of said evaporation inhibiting agent is from about 0.1% to about 10%.

11. The paint stripper composition of claim 1, wherein said effective amount of said evaporation inhibiting agent is from about 0.25% to about 3%.

12. A paint stripper composition having long shelf life and good odor qualities consisting essentially of:

from about 15% to about 40% by weight of d-limonene;

from about 60% to about 85% by weight N-methyl pyrrolidone;

from about 1% to about 5% thickener; and from about 0.1% to about 5% of an evaporation inhibiting agent which is at least partially insoluble in the composition and forms a surface layer;

wherein the d-limonene, N-methyl pyrrolidone, thickener and evaporation inhibiting agent are equal to approximately 100% by weight.

13. The paint stripper composition of claim 12, wherein said thickener is selected from the group consisting of cellulosic thickeners, clays, starches, gums and swellable polymers.

14. The composition of claim 12, wherein said d-limonene is a naturally derived d-limonene having a citrus aroma.

15. The composition of claim 12, wherein said evaporation inhibiting agent is at least partially insoluble in one of the components selected from N-methyl pyrrolidone or d-limonene, and is at least partially soluble in the other of the components.

16. The paint stripper composition of claim 12, further comprising from about 60% to about 75% N-methyl pyrrolidone.

17. The paint stripper composition of claim 12, wherein said evaporation inhibiting agent is selected from the group consisting of beeswax, carnauba, paraffin, micro-crystalline wax, polyester wax and mixtures thereof.

18. The paint stripper composition of claim 12, wherein said effective amount of said evaporation inhibiting agent is from about 0.25% to about 3%.

19. A paint stripper composition having good shelf life and good odor qualities consisting essentially of:

from about 28% to about 34% d-limonene;

from about 65.5% to about 70% N-methyl pyrrolidone;

from about 1% to about 2% of a cellulosic thickener; and from about 0.50% to about 3% of a wax constituent for imparting evaporation inhibiting properties to said composition;

wherein the d-limonene, N-methyl pyrrolidone, cellulosic thickener and wax constituent are equal to approximately 100% by weight.

20. The paint stripper of claim 19, wherein said d-limonene is a naturally derived d-limonene having a citrus aroma.

21. The paint stripper of claim 19, wherein said wax constituent is selected from the group consisting of beeswax, carnauba, paraffin, micro-crystalline wax, polyester wax and mixtures thereof.

* * * * *

UNITED STATES PATENT AND TRADEMARK OFFICE
CERTIFICATE OF CORRECTION

PATENT NO. : 5,478,491  Page 1 of 2
DATED : December 26, 1995
INVENTOR(S) : Chester P. Jarema It is certified that error appears in the above-indentified patent and that said Letters Patent is hereby corrected as shown below:

ON THE TITLE PAGE, under [56] References Cited, U.S. PATENT DOCUMENTS, after "4,865,758 9/1989", "Carter" should be --Caster et al.--.

ON THE TITLE PAGE, under [56] References Cited, OTHER PUBLICATIONS, after "Non-Flammable Paint", "Stripers" should be --Strippers--.

Column 1, Line 63, "acidities" should be --acidifies--.

Column 6, Line 35, "(MA)" should be --(MEA)--.

Column 6, Line 63, "formulations" should be --formulation's--.

Column 8, Line 20, "i.e." should be --i.e.,--.

Column 8, Line 24, "i.e." should be --i.e.,--.

Column 9, Line 44, "i.e." should be --i.e.,--.

Column 9, Line 54, "celluloic" should be --cellulosic--.

Column 10, Line 1, "VIII" should be --VII--.

Column 10, Line 45, "VII" should be --VIII--.

UNITED STATES PATENT AND TRADEMARK OFFICE
CERTIFICATE OF CORRECTION

PATENT NO. : 5,478,491

DATED : December 26, 1995

INVENTOR(S) : Chester P. Jarema

It is certified that error appears in the above-indentified patent and that said Letters Patent is hereby corrected as shown below:

Column 11, Line 12, "i.e." should be --i.e.,--.

Column 11, Line 13, "103° F" should be --103° F.--.

Column 11, Line 43, "i.e." should be --i.e.,--.

Column 12, Line 28, "at" should be --and--.

Signed and Sealed this

Eleventh Day of June, 1996

*Attest:*

BRUCE LEHMAN

*Attesting Officer*  *Commissioner of Patents and Trademarks*